United States Patent [19]

Hoedt

[11] 4,315,875

[45] Feb. 16, 1982

[54] PROCESS FOR MOLDING MINERALIC COMPONENTS WITH ORGANIC BINDERS

[76] Inventor: Helmut Hoedt, Bertramstrasse 69, 6000 Frankfurt 1, Fed. Rep. of Germany

[21] Appl. No.: 138,210

[22] Filed: Apr. 7, 1980

[30] Foreign Application Priority Data

Aug. 22, 1979 [DE] Fed. Rep. of Germany ....... 2933956

[51] Int. Cl.³ .............................................. B06B 3/00
[52] U.S. Cl. ....................................... 264/23; 264/25; 264/69
[58] Field of Search ............................. 264/25, 69, 23

[56] References Cited

U.S. PATENT DOCUMENTS 3,182,102  5/1965  Simnad ................................. 264/25
3,300,849  1/1967  Wiseman ............................... 264/69
3,340,079  9/1967  Bryant .................................. 264/23
3,732,048  5/1973  Guerga et al. ......................... 264/25

Primary Examiner—James R. Hall
Attorney, Agent, or Firm—Steinberg & Raskin

[57] ABSTRACT

The invention relates to a process for the production of molded elements of mineralic components and hardenable organic binders, which are mixed, filled into suitable molds and, by applying heat are hardened, wherein the heat to be supplied to the mass to be hardened is provided by a dielectric heater.

The invention relates also to the apparatus for performing the process wherein two electrode plates arranged at a variable distance relative to each other, a dielectric heater and a mold provided therebetween to receive the mass to be hardened of said molded element is provided.

8 Claims, 3 Drawing Figures

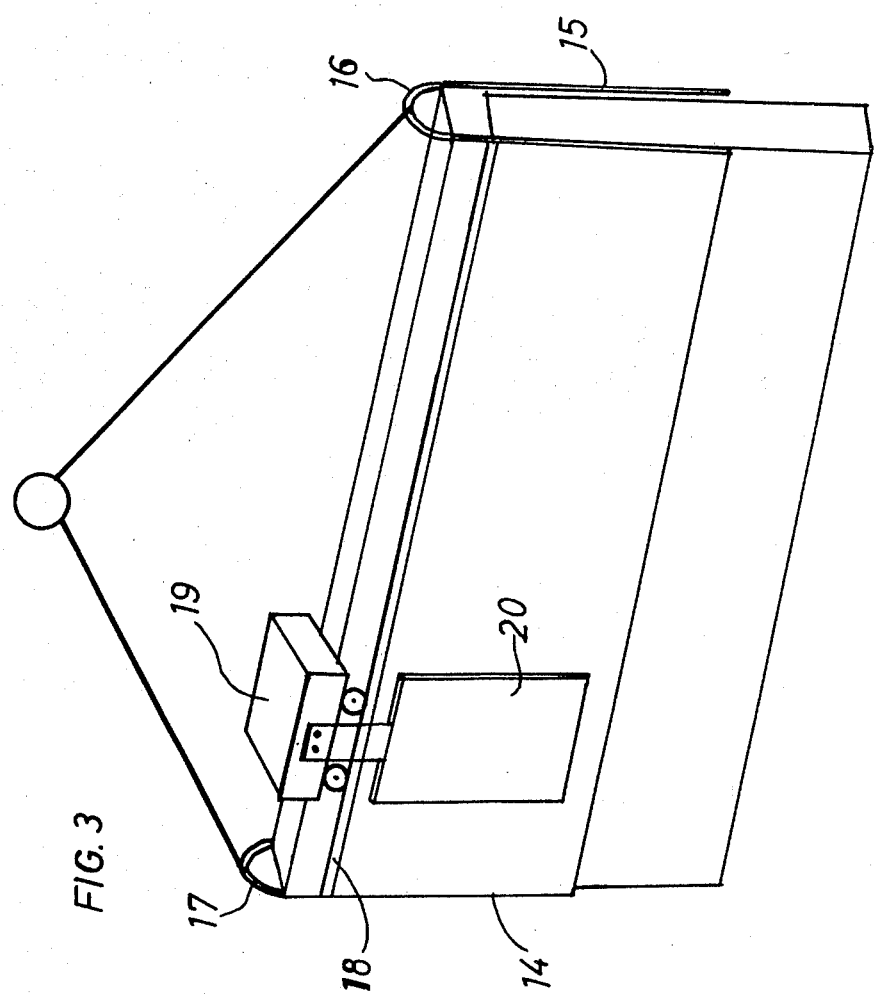

PROCESS FOR MOLDING MINERALIC COMPONENTS WITH ORGANIC BINDERS

The invention relates to a process for the production of molded elements of mineralic components and heat hardenable organic binders, which are mixed, filled into suitable molds and, by applying heat and if necessary pressure are hardened.

My prior German Offenlegungsschrift No. 2,408,503, describes a process and an apparatus for the production of artificial stones and plates of mineralic components and hardenable organic binders, where the starting materials are mixed, filled into the molds, are pressed and, by applying heat, are hardened. The application of heat is effected by heatable molds where the mixture is to be hardened is subjected for 10 to 30 minutes to a temperature within the range of from 150° to 300° C.

This relatively long hardening time is due to the fact that the material to be hardened possesses a relatively poor heat conduction so that the heat provided by the presser board, which is commonly heated by steam in the conventional way, penetrates only very slowly into the material thus effecting setting and hardening.

It is now the aim of the present invention to provide a process by which the hardening of the mass consisting of mineralic components and hardenable organic binders may be accelerated so that the production process may be performed substantially more rapidly and hence in a more cost-saving manner.

In accordance with the invention, the problem is solved in that the heat is supplied to the mass to be hardened via a dielectric heater.

A dielectric heater of this sort has been known and is being employed for various heating and drying problems.

It operates by high frequency, as a rule between 0.5 and 300 megacycles, preferably in the range of about 30 megacycles. Molecular dipoles, such as for instance water molecules introduced into the electric alternate field between capacitor plates, are shifted relative to each other thus exciting mechanical vibrations as the molecular dipoles tend to arrange themselves in the direction corresponding to the alternate field. The energy fed in this manner by the electric field to the dielectric is in this way more or less completely transferred into a thermal molecular movement, i.e. heat. In this way, electrically non-conductive materials are heated in the alternate field, too.

By the process of the invention, the mass to be hardened is introduced between the plates of a capacitor and is uniformly heated by the high frequency energy supplied and heated within a very short period of time. The period of time required for the hardening process depends on the dimensions of the molded element to be produced and is in the range of from seconds up to about 4 minutes.

The process of the invention for the production of molded elements of mineralic components and hardenable organic binders may either be performed under normal pressure or by applying an increased pressure prior to, or during, the hardening process.

In accordance with an other advantageous embodiment of the present invention, the mass to be hardened is subjected to a vibrational treatment prior to, or during, the hardening process.

Such a vibrational treatment may be performed in a well known manner in that the mass to be hardened is exposed to vibrations having frequencies of from 1 to 1000 cycles, preferably from 5 to 100 cycles. The generation of these vibrations may either be performed mechanically, for instance by means of an excentric, or electromagnetically.

By such a vibrational treatment, a better filling of the mold is obtained so that cavities which might occur in the interior of the molded element as well as on the surface thereof and thus might add to a deterioration of the physical properties are safely avoided while the pressure treatment prior to hardening is not necessary at all or need not be performed for an excessively long period of time.

In accordance with a further advantageous embodiment of the present invention, the mass to be hardened is subjected, prior to or during the hardening process to an ultrasonic treatment.

Such ultrasonic treatment, too, leads to the same above-described result of the better filling of the mold and the provision of molded elements of better mechanical strength.

In accordance with a further advantageous embodiment of the process of the invention, it has shown to be particularly advantageous, especially for the series production of molded elements, if the mass to be hardened of the molded element is moved between the electrode plates of the dielectric heater. In this way, setting, and thus completion, of the molded element is obtained within a very short period of time.

The process is thus suited for economic conveyor line production.

Especially in the case of molded elements of larger size, it has shown to be particularly advantageous if the electrode plates of the electric heater are guided on two sides arranged opposite to each other over the mass to be hardened of the molded element.

In this way, large-size molded elements may be hardened, one after the other, as well.

In accordance with a further advantageous embodiment of the process of the invention, at least one vibrator may react, in the direction of movement in front of the electrode plates, onto the mass to be hardened.

Such a vibrator causes complete filling of the mold and avoids the formation of cavities, which would impair the solidity of the resulting molded element.

The apparatus for performing the process for the production of molded elements of mineralic components and hardenable organic binders comprises, according to the present invention, two electrode plates arranged at a variable distance relative to each other, a dielectric heater, and a mold provided therebetween to receive the mass to be hardened of the molded element.

In accordance with a particularly advantageous embodiment of the apparatus for performing the invention, the electrode plates of the dielectric heater constitute at least part of the mold to receive the mass to be hardened of the molded element.

The power of the high frequency generators for the dielectric heater varies in accordance with the size of the molded elements to be produced. Output powers in the order of magnitude of for instance 100 to 600 kva may be applied.

As the electric properties of the material to be hardened change during the course of the heating and of the hardening process, optimum power supply is obtained in common manner by electronically controlled regulating elements. In this way, optimum employment of the apparatus to obtain most rapid hardening of the molded element is gained. In accordance with a further advantageous embodiment of the present invention, a transport device is provided below the electrode plates of the dielectric heater, on which the mass to be hardened of the molded element may be passed in a corresponding mold between the electrode plates. By such an embodiment of the apparatus according to the invention, a continuous process for the manufacture and hardening of molded elements of mineralic components and hardenable organic binders may be accomplished.

In accordance with a particularly advantageous embodiment of the process, the electrode plates of the high frequency heater constitute at least part of a travelling formwork for the production of walls to be used in buildings. The electrode plates may at a certain level extend over the total width of the formwork moving in accordance with the hardening rate of the mass to be hardened together with the formwork so that in this way walls of a building may, continuously and with a relatively high speed, be prepared.

Instead of constituting part of the travelling formwork, the electrode plates of the high frequency heater may be applied to the formwork plates and, operated by corresponding control means, may be moved over the formwork plates and transported further together with the formwork plates. By such an embodiment of the apparatus of the invention, walls made by relatively broad travelling formworks may be hardened in a simple and rapid way.

In this connection, it has shown to be particularly advantageous if in front of the electrode plates in the direction of movement a vibrator is provided, which removes air bubbles and the like from the mass to be hardened prior to the hardening process.

The solidity of the molded elements obtained and particularly of the obtained walls of the buildings is in this way substantially increased.

The operation of the dielectric heater applied in the process invention has been known and has for instance been described in "Ullmanns Encyklopaedie der technischen Chemie", 3rd edition, 1951, pp. 204 and following.

In performing the process of the invention, the following materials are employed.

A. Mineralic Components

Various materials may be taken into consideration. Particularly advantageous results are obtained when employing quartz sand, lime sand, ground pumice sand, gravel sand, and refractory sand. The particle size of the mineralic components is suitably between 0.05 and 4 millimeters. In this connection it has shown to be particularly advantageous to restrict the mineralic components employed, within the above-mentioned range, to 3 to 8 different defined particle sizes, i.e. not to employ the total spectrum of particle sizes but rather certain preferred size ranges only. According to the kind of the mineralic substances employed, the size range, on one hand, and the number of the particle sizes selected from this size range, on the other, may vary.

The most advantageous size ranges as well as the number of preferred particle sizes for preferred mineralic components are listed in the following:

Quartz sand: from 0.05 to 2.0 mm in 3 to 6 different particle sizes

Blast furnance slag: from 0.02 to 1.0 mm ground to 4 to 7 different particle sizes Pumice, ground: from 0.5 to 4.0 mm in 4 to 7 different particle sizes Gravel sand: from 0.05 to 6.0 mm in 1 to 10 different particle sizes Refractory sand: from 0.2 to 3 mm in 4 to 8 different particle sizes.

B. Resinous Components

As the binders in the process of the invention, phenol formaldehyde resins or urea formaldehyde resins or melamine resins may preferably be employed. To these binders are suitably added the common admixing materials such as hardeners, hardening accelerators, etc., before they are mixed with the mineralic portion. The admixing materials may of course also be added during the course of the mixing process.

In addition to the hardeners and the hardening accelerators, so called hydrophobic agents may be admixed as well, which decrease the water absorptive capacity of the final product, which is important particularly in case of walls for houses.

The relation between the mineralic components on the one hand and the organic binders on the other may vary within wide ranges. The relation depends widely on the physical properties required.

Higher proportions of the binder than 10 weight parts of the binder per 90 weight parts of mineralic components are as a rule not necessary and lead to a needless increase of the costs of the product. Smaller proportions than 1.5 weight parts per 98.5 weight parts of mineralic component are not recommended with a view to the properties obtained.

The physical properties of the molded elements obtained in accordance with the process of the invention from mineralic components and organic binders, if quartz sand is employed, are as follows:

Weight per unit volume: 1,600 kg/m$^3$

Bending strength: about 170 kp/cm$^2$

Crushing strength: about 400 kp/cm$^2$

Modulus of elasticity: 160,000 kp/cm$^2$

Coefficient of thermal expansion: linear CTE 20° to 200° C., $140.10^{-7}$/°C.

The molded elements obtained in accordance with the process of the invention have a small water absorptive capacity, they are not inflammable, they have an antiseptic effect, and they are suited for sawing, doweling, nailing, screwing, and boring. In addition thereto, they possess a very good sound absorbing capacity. In view of these properties, they are particularly suited for houses, the production of wall linings, and separating walls as well as of sanitary objects.

The process according to the invention will be described in more detail in the following based on the attached drawings, where FIG. 1 is an apparatus for hardening molded elements in a conveyor belt process.

FIG. 3 is a travelling formwork for producing walls to be used in buildings together with the dielectric heater provided thereon.

Figure 1:
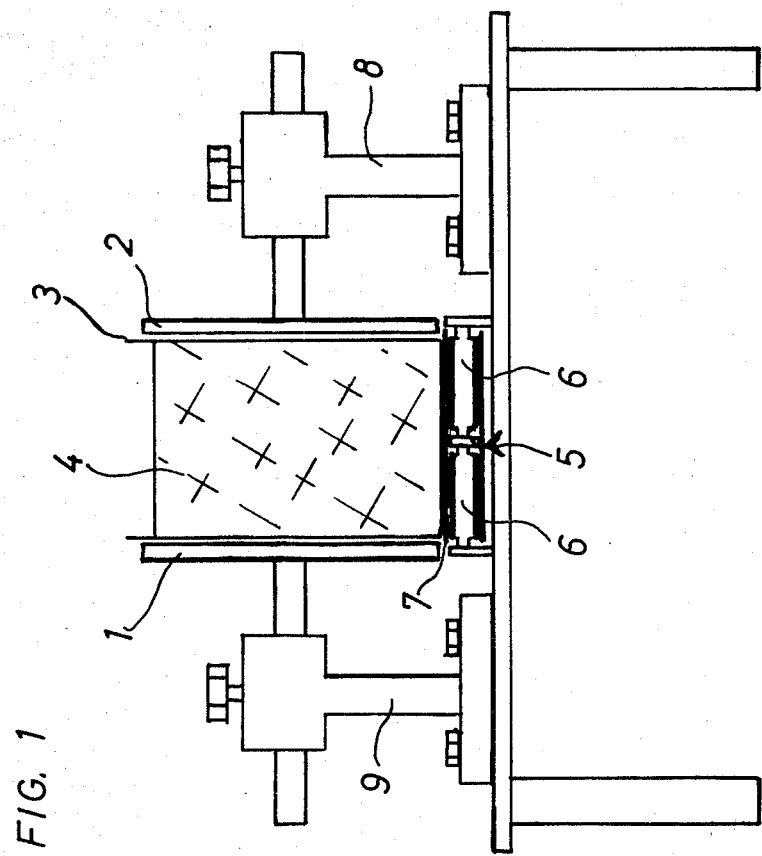

The apparatus used in the invention as shown in FIG. 1 includes two electrode plates 1 and 2, which may be arranged at a variable distance relative to each other.

Between these electrode plates 1 and 2, the material 4 to be hardened and provided in a mold 3 is moved on a transport device 5 provided below the electrode plates.

The transport device comprises a rubber conveyor belt 7, which moves on rolls 6.

For the sake of clarity, the high frequency generator has not been shown. Any high frequency generator supplying to electrode plates 1 and 2 the required high frequency energy and known to those versed in the art may be employed.

The transporting speed of conveyor belt 7 is so adjusted that the material 4 to be hardened in mold 3 is set after it had passed the two electrode plates.

The distance between the two electrode plates 1 and 2 is adjusted by holding devices 8 and 9 in accordance with the thickness of the molded element to be manufactured.

Figure 2:
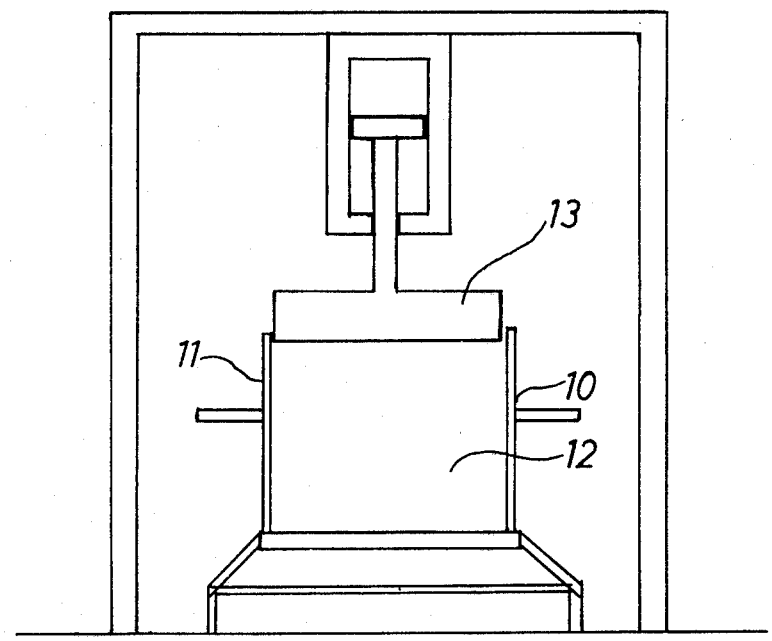
FIG. 2 is an apparatus, wherein the electrode plates of the dielectric heater constitute at the same time part of the mold to receive the mass to be hardened.

In the embodiment shown in FIG. 2, electrode plates 10 and 11 constitute part of the mold for the molded element to be hardened. The material 12 to be hardened is filled into this mold and pressed by hydraulic press 13 acting on mold 3 and is then hardened by high frequency energy applied to electrode plates 10 and 11.

In FIG. 3, a travelling formwork for the production of walls to be used in buildings is shown, which comprises two sheetings 14 and 15 arranged at a distance relative to each other and suspended on handles 16 and 17 to an elevating mechanism. Along the upper edge of the sheetings, a rail 18 each is provided on which the holding means 19 for the two electrode plates 20 and 21 (not visible on the rear side) arranged opposite relative to each other, is provided movably in horizontal direction.

The high frequency generator supplying the required high frequency energy to the electrode plates 20 and 21 is not shown.

The material to be hardened is filled between the two sheetings 14 and 15, and subsequently the two electrode plates 20 and 21 of the dielectric heating device are moved with constant speed over the two sheetings thereby hardening the building material. In view of the relatively short hardening time, the walls of buildings may very rapidly be produced by means of such a travelling formwork thus shortening the construction period very substantially.

The electrode plates may self evidently also be provided directly on the travelling formwork, in which case they extend over the total width of the sheetings.

The electrode plates may moreover directly constitute part of the travelling sheetings.

In case of the embodiment according to FIG. 3, there may also be provided on the horizontally movable holding means 19, as seen in the moving direction in front of the electrode plates 20 and 21, a vibrator each, which liberates the material to be hardened and filled between the sheetings 14 and 15 from air inclusions before it is heated by the electrode plates 20 and 21 of the dielectric heater and is set in this way.

As the vibrators, the well known high frequency exterior vibrators or normal frequency exterior vibrators of Wacker Werke, Munich, Germany, may be employed. It is self evident that vibrators of other makes may be employed as well.

I claim:

1. A process for molding an electrically non conductive solid mass body of a mineralic particulate component and a heat hardenable organic binder, comprising:
   (a) mixing said heat hardenable organic binder with said mineralic component having a particle size of 0.05–6.0 mm,
   wherein the binder content is sufficient, upon heating, to harden and to bond said component particles into a solid mass,
   (b) filling a mold with said mixture, and
   (c) heating said mixture in said mold by a dielectric heat source to harden said binder and form said solid mass body.

2. The process of claim 1 wherein following step (b) said mixture is subjected to a vibrational treatment.

3. The process of claim 1 wherein following step (b) said mixture is subjected to an ultrasonic treatment.

4. The process of claim 1 where in step (c) said heat source comprises a heater having 2 electrode plates between which said mixture and mold are placed.

5. The process of claim 1 wherein said mineralic component comprises quartz sand, blast furnace slag, lime sand, pumice sand, gravel sand, or refractory sand.

6. The process of claim 5 wherein:
said quartz sand particle size is 0.05–2.0 mm in three to six different particle sizes,
said blast furnace slag particle size is 0.02–1.00 mm in four to seven different particle sizes,
said pumice sand particle size is 0.5–4.0 mm in four to seven different particle sizes,
said gravel sand particle size is 0.05–6.00 mm in one to ten different particle sizes, and
said refractory sand particle size is 0.2–3.0 mm in four to eight different particle sizes.

7. The process of claim 6 wherein said organic binder is a phenol-formaldehyde resin, a urea-formaldehyde resin, or a melamine resin.

8. The process of claim 7 wherein the organic binder content is about 1.5–10.0% by weight.

* * * * *